United States Patent
Zhang et al.

(10) Patent No.: US 12,297,327 B1
(45) Date of Patent: May 13, 2025

(54) POLYMER AND PREPARATION METHOD THEREFOR, AND ANION-EXCHANGE MEMBRANE

(71) Applicants: TAN KAH KEE INNOVATION LABORATORY, Fujian (CN); XIAMEN KAH MEMBRANE TECHNOLOGY LTD., Fujian (CN)

(72) Inventors: Qiugen Zhang, Fujian (CN); Yichang Ma, Fujian (CN)

(73) Assignees: TAN KAH KEE INNOVATION LABORATORY, Fujian (CN); XIAMEN KAH MEMBRANE TECHNOLOGY LTD., Fujian (CN)

( * ) Notice: Subject to any disclaimer, the term of this patent is extended or adjusted under 35 U.S.C. 154(b) by 0 days.

(21) Appl. No.: 18/863,760

(22) PCT Filed: May 6, 2023

(86) PCT No.: PCT/CN2023/092597
§ 371 (c)(1),
(2) Date: Nov. 7, 2024

(87) PCT Pub. No.: WO2023/217050
PCT Pub. Date: Nov. 16, 2023

(30) Foreign Application Priority Data

May 9, 2022 (CN) .......................... 202210497739.2

(51) Int. Cl.
$C08G\ 81/00$ (2006.01)
$B01J\ 41/13$ (2017.01)
$C08G\ 61/02$ (2006.01)

(52) U.S. Cl.
CPC .............. *C08G 81/00* (2013.01); *B01J 41/13* (2017.01); *C08G 61/02* (2013.01); *C08G 2261/143* (2013.01); *C08G 2261/146* (2013.01); *C08G 2261/312* (2013.01)

(58) Field of Classification Search
CPC ........ C08G 2261/124; C08G 2261/143; C08G 2261/146; C08G 2261/312; C08G 2261/3326; B01J 41/13; B01J 41/14
See application file for complete search history.

(56) References Cited

U.S. PATENT DOCUMENTS

| | | | | |
|---|---|---|---|---|
| 2017/0355811 | A1* | 12/2017 | Bae | C08G 61/02 |
| 2019/0336143 | A1* | 11/2019 | Wright | A61B 17/1778 |
| 2020/0308341 | A1* | 10/2020 | Yan | C08G 10/00 |

FOREIGN PATENT DOCUMENTS

| | | | |
|---|---|---|---|
| CN | 107112563 A | 8/2017 | |
| CN | 110746561 A | 2/2020 | |
| CN | 112552488 A | 3/2021 | |
| CN | 113150344 A | * 7/2021 | ............ C08G 61/02 |
| CN | 113583279 A | 11/2021 | |
| CN | 113659180 A | 11/2021 | |
| CN | 114025957 A | 2/2022 | |
| CN | 114989437 A | 9/2022 | |

OTHER PUBLICATIONS

Lee, et all., "Robust Hydroxide Ion Conducting Poly(biphenyl alkylene)s for Alkaline Fuel Cell Membranes", ACS Macro Letters, 4, 814-818, Jul. 16, 2015. (Year: 2015).*
CN113150344A English Machine Translation, prepared Mar. 17, 2025. (Year: 2025).*
First Office Action dated Apr. 29, 2023 received in Chinese Patent Application No. 202210497739.2.
Second Office Action dated Sep. 23, 2023 received in Chinese Patent Application No. 202210497739.2.

(Continued)

*Primary Examiner* — Christopher M Rodd
(74) *Attorney, Agent, or Firm* — Scully, Scott, Murphy & Presser, P.C.

(57) ABSTRACT

The present disclosure relates to a polymer and a preparation method therefor, and an anion-exchange membrane. The polymer comprises a structural unit represented by Formula (1) and a structural unit represented by Formula (2), wherein $Ar_1$ and $Ar_2$ are each independently selected from an arylene group derived from an aromatic compound, $L_1$ is selected from a C1-C10 alkylene, $R_2$ is selected from a quaternary ammonium group, and $R_4$ is selected from H or a C1-C7 alkyl. A high-performance anion-exchange membrane having high ion conductivity, low swelling, and strong alkali resistance can be obtained from the polymer of the present application, and no noble metal catalyst is required in a synthesis method, which is environment-friendly and simple; the present application has a broad application prospect.

20 Claims, 3 Drawing Sheets

(56) References Cited

OTHER PUBLICATIONS

Notice of Grant of Patent Right dated Oct. 24, 2023 received in Chinese Patent Application No. 202210497739.2.
International Search Report dated Aug. 6, 2023 received in International Application No. PCT/CN2023/092597.

* cited by examiner

POLYMER AND PREPARATION METHOD THEREFOR, AND ANION-EXCHANGE MEMBRANE

CROSS-REFERENCE TO RELATED APPLICATIONS

This application is a National Stage Entry under 35 U.S.C. § 371 of PCT International Application No. PCT/CN2023/092597 filed on May 6, 2023, which claims priority to Chinese Patent Application No. 202210497739.2 filed with the China National Intellectual Property Administration on May 9, 2022 and entitled "POLYMER AND PREPARATION METHOD THEREFOR, AND ANION-EXCHANGE MEMBRANE", the entire contents of each of which are incorporated herein by reference for all purposes.

FIELD

The present disclosure relates to the field of polymer chemistry, specifically to polymer and preparation method therefor, and anion-exchange membrane.

BACKGROUND

Anion-exchange membrane, as an alkaline polyelectrolyte film, selectively transferring anions while serving as a barrier, is widely used in fuel cells, water electrolysis, electrochemical reduction of carbon dioxide, electrodialysis and other fields. Anion-exchange membrane is used in alkaline working environments, where oxidation-reduction reactions are more likely to take place, thus reducing the catalyst loading and enabling the use of non-noble metal catalyst in place of noble metal catalyst, which greatly reduces costs. However, in a high temperature and strong alkaline working environment, the polyelectrolyte films are susceptible to attack from hydroxide ions, prone to nucleophilic substitution, Hoffman elimination and other reactions, which cause degradation of cationic groups and breakage of polymer main chain structure, resulting in some problems such as reduced ionic conduction ability, breakage of membranes, and fuel permeation, which make it impossible for the working system to run smoothly for a long time. So it is important to get an anion-exchange membrane having excellent alkali resistance. Anio-exchange membrane having excellent performance require not only good alkali resistance, but also high ion conductivity, good thermal stability, mechanical stability and dimensional stability and so on. High ion conductivity tends to require high ion exchange capacity, which will induce high solubility and poor dimensional stability. This, in turn, involves trade-off effects between mechanical and dimensional stability and ion conductivity, which must be weighed and considered.

CN107112563A discloses novel polymers and a method for their manufacture, wherein reacting an aromatic compound and a trifluoroalkyl ketone in the presence of a strong acid (acid-catalyzed Friedel-Crafts polycondensation) to form a bromoalkylated precursor polymer; by reacting with a trialkylamine, the bromoalkylated precursor polymer is then cationically functionalized to form a polyarylene anion exchange membrane having a main chain free of ether linkages. However, the aforementioned prior art still has some deficiencies. For example, before the introduction of trifluoroacetone monomer, the polymer PBPA⁺ has a high swelling ratio, and after the introduction of trifluoroacetone, the IEC (ion exchange capacity) is reduced, and the water absorption and swelling ratio are decreased as a result, but the hydroxide ion conductivity also is decreased.

Therefore, there is a need to develop a more effective technical solution, which can achieve a high hydroxide ion conductivity and alkali resistance while ensuring a low swelling ratio, and can enhance the performance of anion exchange membranes.

SUMMARY

In order to solve the problem that the water absorption and swelling rate of the anion exchange membrane in the prior art cannot be balanced with the hydroxide ion conductivity, this disclosure provides a polymer and preparation method therefor, and an anion-exchange membrane. The anion-exchange membranes prepared from the polymers of this disclosure possess high hydroxide ion conductivity and alkali resistance, while low water absorption and swelling ratios are maintained.

A first aspect of the present disclosure provides a polymer comprising a structural unit represented by Formula (1) and a structural unit represented by Formula (2),

Formula (1)

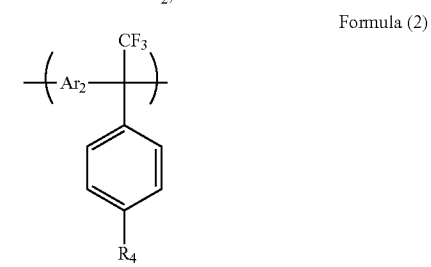

Formula (2)

wherein $Ar_1$ and $Ar_2$ are each independently selected from arylene derived from an aromatic compound, $L_1$ is selected from C1-C10 alkylene, $R_2$ is selected from a quaternary ammonium group; and $R_4$ is selected from H or C1-C7 alkyl.

A second aspect of the present disclosure provides a method for preparing polymers, comprising:
- contacting an aromatic compound with a first trifluoroalkyl ketone and a second trifluoroalkyl ketone in the presence of a strong acid, to form a precursor polymer;
- contacting the precursor polymer with a tertiary amine compound to form the polymers.

A third aspect of the present disclosure provides a polymer prepared by the method of the present disclosure described above.

A fourth aspect of the present disclosure provides the use of the polymers of the present disclosure described above in anion exchange membranes.

A fifth aspect of the present disclosure provides anion-exchange membranes comprising the polymers of the present disclosure.

The polymers of the present disclosure comprise a fluorine-containing all-carbon main chain, flexible long alkyl side chains, and rigid benzene ring side groups. The main chain does not contain heteroatomic groups, and the cationic functional groups are connected by flexible long alkyl side chains, which reduces the influence of cationic groups on the main chain and greatly enhances alkali resistance. The flexible long alkyl side chains increase the distance between the cationic groups and the main chain, and reduces the swelling of the main chain. Meanwhile, the introduction of rigid hydrophobic benzene ring side groups further increases the difference between hydrophilic and hydrophobic chain segments due to the strong hydrophobicity of the benzene ring. In addition, the π-π interactions between the benzene rings make the hydrophobic chain segments more aggregated with each other, which further promotes the separation between the hydrophilic and hydrophobic microphases, which is conducive to the construction of more connected and efficient ion transport channels, and improves the ion conductivity and alkaline stability. The synthesis methods of the polymer are environment-friendly and simple. The introduction of haloalkyls in the polymer provides unlimited possibilities for subsequent cation functionalization. The ionomers and anion-exchange membranes prepared from the polymers can be applied to the fields such as fuel cells, water electrolysis, electrochemical reduction of carbon dioxide, electrodialysis and the like.

The random type polymers provided by the disclosure have a simple synthesis method. The block polymers have relatively more synthesis steps, but more regular chain segment distribution structure can be obtained, and as a result the separation between the hydrophilic and hydrophobic microphases is further promoted. It improves ion conductivity and alkali resistance, further improve the performance of polyarylidene anion exchange membranes, and break through the limitations of Friedel-Crafts alkylation polymerization. A high-performance anion-exchange membrane having high ion conductivity, low swelling, and strong alkali resistance is obtained. In addition, no noble metal catalyst is required in a synthesis method, which is environment-friendly and simple. The polymer has a broad application prospect.

DETAILED DESCRIPTION

Figure 1:
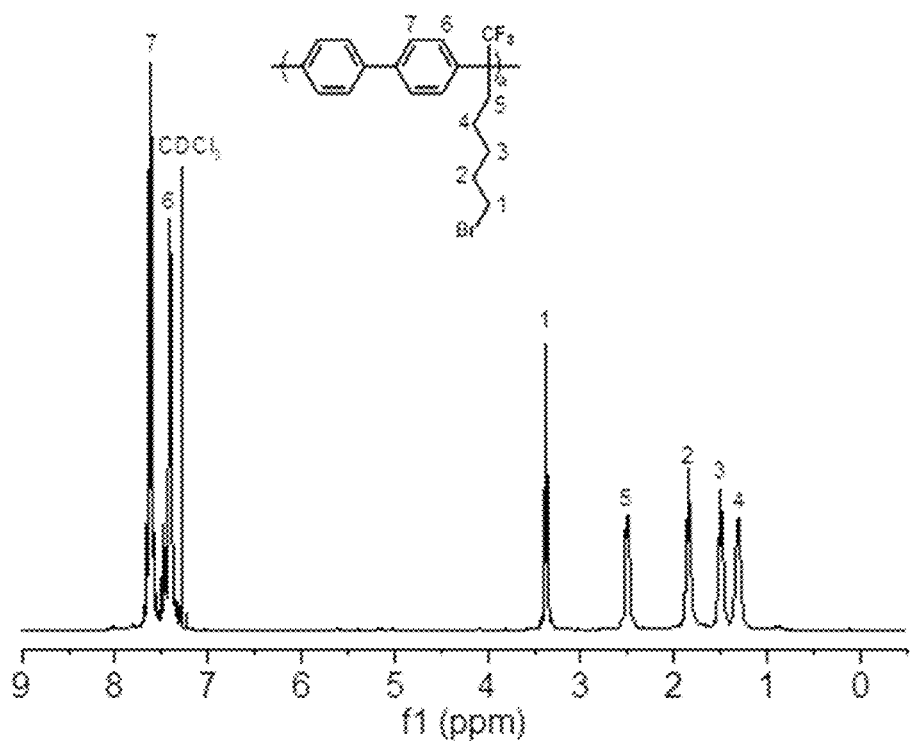
FIG. 1 shows $^1$H NMR spectra of the oligomer O-PBPBr.

The present application will be described in further detail below through examples. The features and advantages of the present application will become clearer from these descriptions.

The word "exemplary" is used herein to mean "used as an example, embodiment or illustrative". Any example illustrated herein as "exemplary" need not be construed as superior to or better than any other example. Although various aspects of the examples are shown in the drawings, it is not necessary to draw the drawings to scale unless otherwise indicated.

In addition, the technical features involved in the different embodiments of the present disclosure described below may be combined with each other as long as they do not conflict with each other.

A first aspect of the present disclosure provides a polymer comprising a structural unit represented by Formula (1) and a structural unit represented by Formula (2),

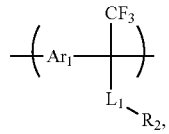

Formula (1)

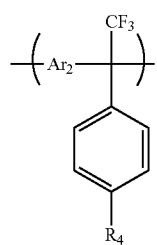

Formula (2)

wherein $Ar_1$ and $Ar_2$ are each independently selected from arylene derived from an aromatic compound, $L_1$ is selected from C1-C10 alkylene, $R_2$ is selected from a quaternary ammonium group; and $R_4$ is selected from H or C1-C7 alkyl.

In the present disclosure, based on the total moles of a structural unit represented by Formula (1) and a structural unit represented by Formula (2), the proportion of the structural unit represented by Formula (1) is 60%-99%, and the proportion of the structural unit represented by Formula (2) is 1%-40%.

In the present disclosure, the polymer may have a weight average molecular weight of 30000-1000000 g/mol, preferably 40000-500000 g/mol. In one embodiment, the polymers may have a polydispersity of 1-3, preferably 1.1-2.0.

According to an embodiment of the present disclosure, the polymer may be a random polymer.

The term "random" indicates in the present disclosure that the comonomers of a random copolymer are randomly distributed within the copolymer. The term "random" is understood according to IUPAC (Glossary of basic terms in polymer science, recommended by IUPAC, 1996).

In the present disclosure, the structural unit represented by Formula (1) represents a hydrophilic segment and the structural unit represented by Formula (2) represents a hydrophobic segment. When the polymer is a random polymer, the proportion of hydrophobic segments should not be excessively high. In one embodiment, when the polymer is a random polymer, based on the total moles of the structural unit represented by Formula (1) and the structural unit represented by Formula (2), the proportion of the structural unit represented by Formula (1) is 70%-98%, for example 80%-98%, more preferably 85%-95%; and the proportion of the structural unit represented by Formula (2) is 2%-30%, for example 2%-20%, more preferably 5%-15%.

According to an embodiment of the present disclosure, the polymer may be a block polymer, which may comprise a block A having the structure represented by Formula (3), and a block B having the structure represented by Formula (4),

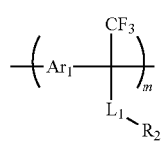
Formula (3)

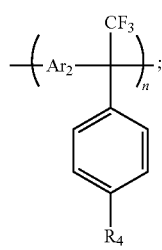
Formula (4)

wherein m represents the degree of polymerization of block A, m≥3, preferably 3-10; and n represents the degree of polymerization of block B, n≥3, preferably 3-10.

In the present disclosure, the structural unit represented by Formula (3) represents a hydrophilic chain segment, and the structural unit represented by Formula (4) represents a hydrophobic chain segment. When the polymer is a block polymer, the proportion of hydrophobic chain segments should not be excessively high. In one embodiment, when the polymer is a block polymer, based on the total moles of the structural unit represented by Formula (3) and the structural unit represented by Formula (4), the proportion of the structural unit represented by Formula (3) is 60%-99%, for example 75%-95%, more preferably 80%-90%; and the proportion of the structural unit represented by Formula (4) is 1%-40%, for example 5%-25%, more preferably 10%-20%.

In the present disclosure, $Ar_1$ and $Ar_2$ may each independently be selected from at least one of the following structures:

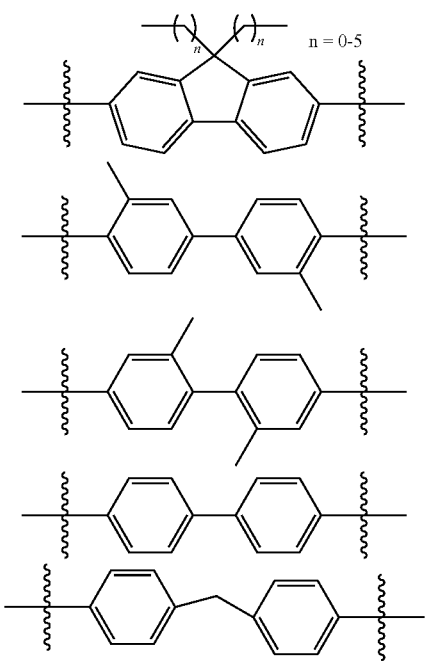

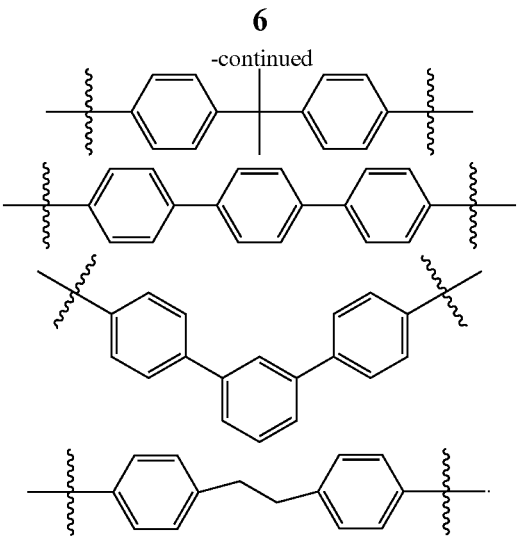

$R_2$ may be selected from at least one of the following structures:

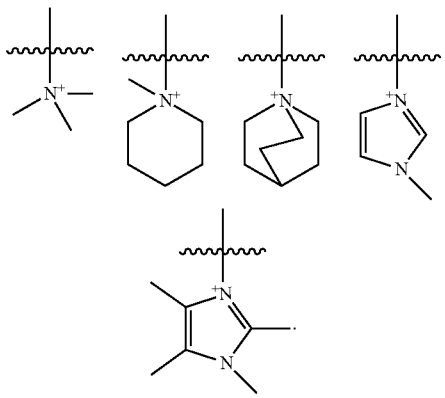

$R_4$ may be selected from at least one of the following structures:
—H, —CH(CH$_3$)$_2$, —CH(CH$_3$) CH$_2$CH$_3$, —CH$_2$C(CH$_3$)$_3$, —(CH$_2$)pCH$_3$, wherein, p is an integer of 0-6.

In a preferred embodiment of the disclosure, the structures of $R_1$ and $R_3$ are shown below:

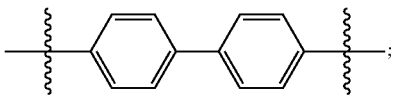

In a preferred embodiment of the disclosure, the structures of $R_2$ is shown below:

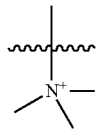

In a preferred embodiment of the disclosure, $R_4$ is H.
In a preferred embodiment of the disclosure, the structural unit represented by Formula (1) is a structural unit represented by Formula (5), and the structural unit represented by Formula (2) is a structural unit represented by Formula (6), respectively,

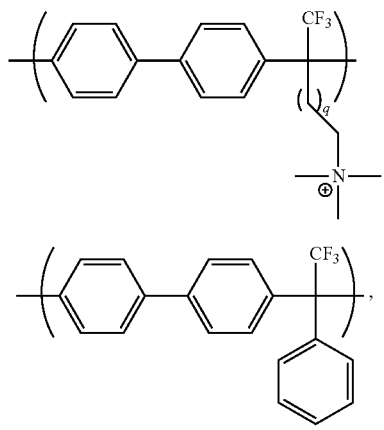

Formula (5)

Formula (6)

wherein q has a value of 1-10, preferably 3-8.

In a preferred embodiment of the disclosure, the polymer is a block polymer comprising a block A having the structure represented by Formula (7) and a block B having the structure represented by Formula (8), respectively,

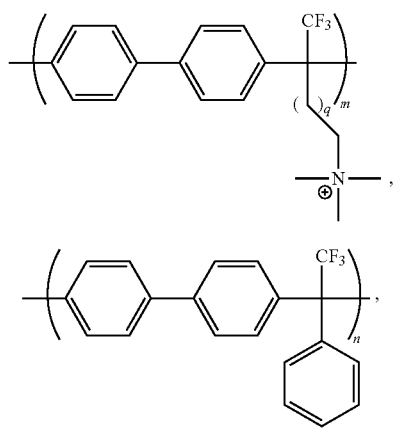

Formula (7)

Formula (8)

wherein m represents the degree of polymerization of block A, m≥3, preferably 3-10; and n represents the degree of polymerization of block B, n≥3, preferably 3-10.

A second aspect of the present disclosure provides a method for preparing polymers comprising:
contacting an aromatic compound with a first trifluoroalkyl ketone and a second trifluoroalkyl ketone in the presence of a strong acid, to form a precursor polymer; and
contacting the precursor polymer with a tertiary amine compound to form the polymers.

In a preferred embodiment of the disclosure, the polymer is a random polymer, and the method comprising:
(1) contacting an aromatic compound with a first trifluoroalkyl ketone and a second trifluoroalkyl ketone in the presence of a strong acid, to form a haloalkylated precursor polymer; and
(2) contacting the haloalkylated precursor polymer with a tertiary amine compound to form the polymers.

In the present disclosure, the strong acid is not specifically limited and may be various strong acids that catalyze Friedel-Crafts alkylation polymerization reaction in the field. In a preferred embodiment, the strong acid is selected from at least one of the following compounds: trifluoromethanesulfonic acid, methanesulfonic acid, a mixed acid of trifluoromethanesulfonic acid and trifluoroacetic acid, a mixed acid of methanesulfonic acid and trifluoroacetic acid. More preferably, the strong acid is trifluoromethanesulfonic acid.

In the present disclosure, the aromatic compound can be selected from at least one of the following compounds: biphenyl, terphenyl, m-terphenyl, diphenylmethane, 9,9-dimethylfluorene, 9,9-diethylfluorene, 9,9-dipropylfluorene, 9,9-dibutylfluorene, 9,9-dipentylfluorene, 9,9-dihexylfluorene, 1,2-diphenylethane, 2,2-dimethylbiphenyl, 2,2-diphenylpropane, 3,3'-dimethylbiphenyl. In a preferred embodiment of the disclosure, the aromatic compound is a biphenyl.

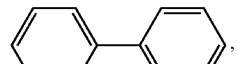

(biphenyl)

(terphenyl)

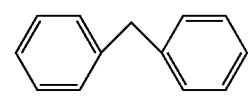 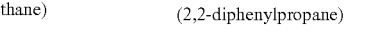

(diphenylmethane)       (2,2-diphenylpropane)

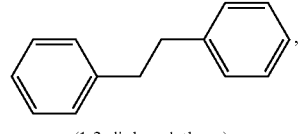

(1,2-diphenylethane)

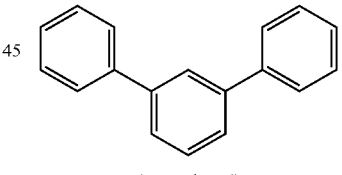  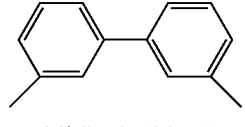

(m-terphenyl)       (3,3'-dimethylbiphenyl)

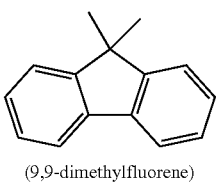  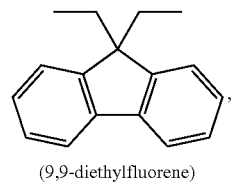

(9,9-dimethylfluorene)       (9,9-diethylfluorene)

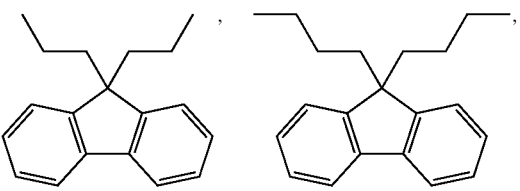 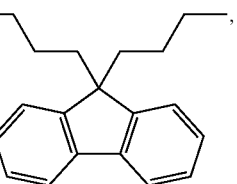

(9,9-dipropylfluorene)       (9,9-dibutylfluorene)

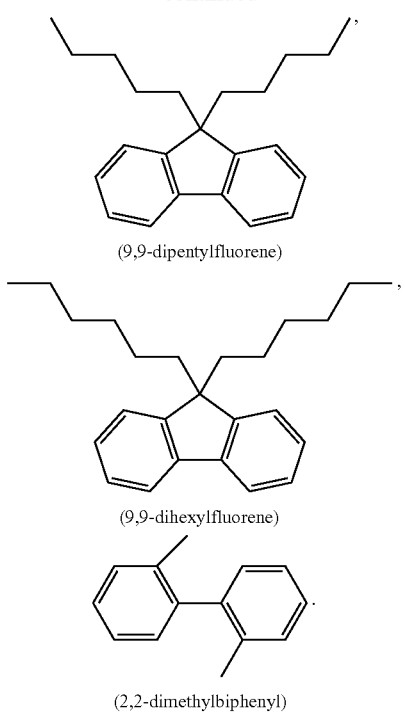

(9,9-dipentylfluorene), (9,9-dihexylfluorene), (2,2-dimethylbiphenyl).

In the present disclosure, the first trifluoroalkyl ketone may be selected from at least one of the following compounds: 7-bromo-1,1,1-trifluoro-2-heptanone, 7-chloro-1,1,1-trifluoro-2-heptanone, 6-bromo-1,1,1-trifluoro-2-hexanone, 5-bromo-1,1,1-trifluoro-2-pentanone and 8-bromo-1,1,1-trifluoro-2-octanone.

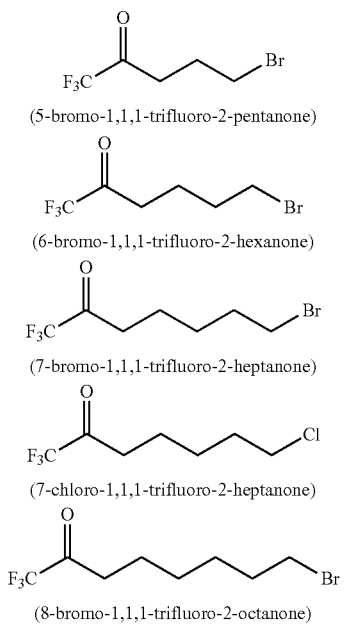

(5-bromo-1,1,1-trifluoro-2-pentanone)

(6-bromo-1,1,1-trifluoro-2-hexanone)

(7-bromo-1,1,1-trifluoro-2-heptanone)

(7-chloro-1,1,1-trifluoro-2-heptanone)

(8-bromo-1,1,1-trifluoro-2-octanone)

In a preferred embodiment of the disclosure, the first trifluoroalkyl ketone is 7-bromo-1,1,1-trifluoro-2-heptanone.

The second trifluoroalkyl ketone is selected from at least one of the following compounds: 2,2,2-trifluoroacetophenone, 2,2,2-trifluoro-1-(4-isopropylphenyl)ethan-1-one, 2,2,2-trifluoro-1-(4-(sec-butyl)phenyl)ethan-1-one, 2,2,2-trifluoro-1-(4-neopentylphenyl)ethan-1-one, 2,2,2-trifluoro-1-(4-ethylphenyl) ethan-1-one, 2,2,2-trifluoro-1-(4-propylphenyl)ethan-1-one, 2,2,2-trifluoro-1-(4-butylphenyl)ethan-1-one, 2,2,2-trifluoro-1-(4-pentylphenyl)ethan-1-one, 2,2,2-trifluoro-1-(4-hexylphenyl)ethan-1-one, and 2,2,2-trifluoro-1-(4-heptylphenyl) ethan-1-one.

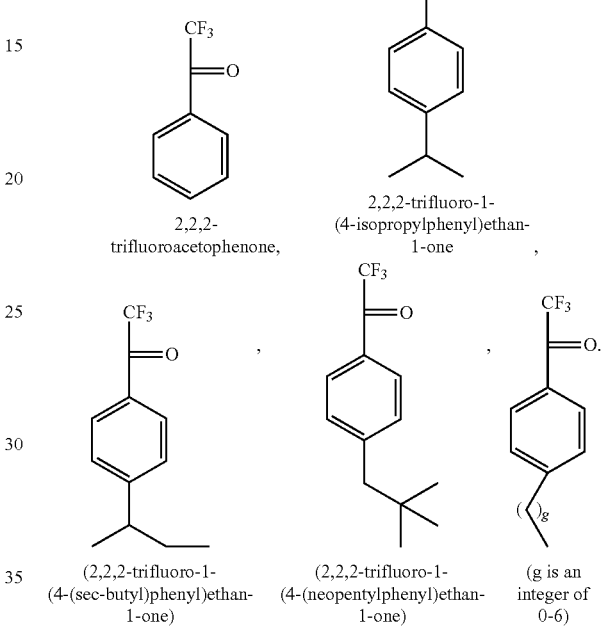

2,2,2-trifluoroacetophenone, 2,2,2-trifluoro-1-(4-isopropylphenyl)ethan-1-one, (2,2,2-trifluoro-1-(4-(sec-butyl)phenyl)ethan-1-one)

(2,2,2-trifluoro-1-(4-(neopentylphenyl)ethan-1-one)

(g is an integer of 0-6)

In a preferred embodiment of the disclosure, the second trifluoroalkyl ketone is 2, 2, 2-trifluoroacetophenone.

In the present disclosure, the tertiary amine compound may be selected from at least one of the following compounds: trimethylamine, N-methylpiperidine, quinine, N-methylimidazole, 1,2,4,5-tetramethylimidazole.

In a preferred embodiment of the disclosure, the tertiary amine compound is trimethylamine.

In the present disclosure, the molar ratio of the aromatic compound to the first trifluoroalkyl ketone and the second trifluoroalkyl ketone may be 1:(0.7-0.99):(0.01-0.3), more preferably 1:0.8-0.96:0.04-0.2; further preferably 1:(0.85-0.95):(0.05-0.15).

In the present disclosure, the molar ratio of the precursor polymer to the tertiary amine compound may be 1:1.01-1.5, preferably 1:1.05-1.3.

In the present disclosure, the amount of the strong acid is not specifically limited, and may be conventional selection in the art. In a preferred embodiment, the molar ratio of the strong acid to the aromatic compound may be 5-10:1, preferably 6-8:1.

The polymer may have a weight average molecular weight of 30000-1000000 g/mol, preferably 40000-500000 g/mol. In one embodiment, the polymers may have a polydispersity of 1-3, preferably 1.1-2.0.

In the present disclosure, when the polymer is a random polymer, in step (1) of the method, the contact temperature may be 0-35° C. and the contact time may be 10-30 h. There is no special limit to the solvent used in step (1), which may be, for example, dichloromethane.

In the present disclosure, when the polymer is a random polymer, in step (2) of the method, the contact temperature may be 15-90° C. and the contact time may be 18-72 h. There is no special limit to the solvent used in step (2), which may be, for example, N-methylpyrrolidone and/or tetrahydrofuran.

In a preferred embodiment of the disclosure, the polymer is a block polymer, the method comprising:
(1) contacting a first aromatic compound with a first trifluoroalkyl ketone in the presence of a first strong acid, to form a first precursor polymer; (2) contacting a second aromatic compound with a second trifluoroalkyl ketone in the presence of a second strong acid, to form a second precursor polymer;
(3) contacting a first precursor polymer, a second precursor polymer with a first trifluoroalkyl ketone or a second trifluoroalkyl ketone in the presence of a third strong acid, to form a block polymer precursor; and
(4) contacting the block polymer precursor with a tertiary amine compound to form the block polymers.

In the present disclosure, the first aromatic compound and the second aromatic compound may each independently be selected from at least one of the following compounds: biphenyl, terphenyl, m-terphenyl, diphenylmethane, 9,9-dimethylfluorene, 9,9-diethylfluorene, 9,9-dipropylfluorene, 9,9-dibutylfluorene, 9,9-dipentylfluorene, 9,9-dihexylfluorene, 1,2-diphenylethane, 2,2-dimethylbiphenyl, 2,2-diphenylpropane, 3,3'-dimethylbiphenyl; more preferably, the first aromatic compound and the second aromatic compound are biphenyl.

Preferably, the tertiary amine compound is selected from at least one of the following compounds: trimethylamine, N-methylpiperidine, quinine, N-methylimidazole, 1,2,4,5-tetramethylimidazole; more preferably, the tertiary amine compound is trimethylamine.

In the present disclosure, the first strong acid, the second strong acid and the third strong acid are not specifically limited and may be various strong acids that catalyze Friedel-Crafts alkylation polymerization reaction in the present field. In a preferred embodiment, the first strong acid, the second strong acid and the third strong acid are each independently selected from at least one of the following compounds: trifluoromethanesulfonic acid, methanesulfonic acid, a mixed acid of trifluoromethanesulfonic acid and trifluoroacetic acid, a mixed acid of methanesulfonic acid and trifluoroacetic acid. More preferably, all of the first strong acid, the second strong acid and the third strong acid are trifluoromethanesulfonic acid.

In the present disclosure, the first trifluoroalkyl ketone may be selected from at least one of the following: 7-bromo-1,1,1-trifluoro-2-heptanone, 7-chloro-1,1,1-trifluoro-2-heptanone, 6-bromo-1,1,1-trifluoro-2-hexanone, 5-bromo-1,1,1-trifluoro-2-pentanone and 8-bromo-1,1,1-trifluoro-2-octanone, preferably 7-bromo-1,1,1-trifluoro-2-heptanone.

In the present disclosure, the second trifluoroalkyl ketone is selected from at least one of the following: 2,2,2-trifluoroacetophenone, 2,2,2-trifluoro-1-(4-isopropylphenyl)ethan-1-one, 2,2,2-trifluoro-1-(4-(sec-butyl)phenyl)ethan-1-one, 2,2,2-trifluoro-1-(4-neopentylphenyl)ethan-1-one, 2,2,2-trifluoro-1-(4-ethylphenyl)ethan-1-one, 2,2,2-trifluoro-1-(4-propylphenyl)ethan-1-one, 2,2,2-trifluoro-1-(4-butylphenyl)ethan-1-one, 2,2,2-trifluoro-1-(4-pentylphenyl)ethan-1-one, 2,2,2-trifluoro-1-(4-hexylphenyl)ethan-1-one, and 2,2,2-trifluoro-1-(4-heptylphenyl)ethan-1-one, preferably 2,2,2-trifluoroacetophenone.

In a preferred embodiment of the disclosure, the molar ratio of the first aromatic compound to the first trifluoroalkyl ketone may be 1:(1.01-1.5), preferably 1:(1.1-1.3).

In a preferred embodiment of the disclosure, the molar ratio of the second aromatic compound to the second trifluoroalkyl ketone may be 1:(1-1.3), preferably 1:(1.02-1.2).

In the present disclosure, the molar ratio of the first precursor polymer, the second precursor polymer to the first trifluoroalkyl ketone or second trifluoroalkyl ketone may be (0.75-0.95):(0.05-0.25):(1.2-2), preferably (0.8-0.9):(0.1-0.2):(1.3-1.8).

In the present disclosure, the molar ratio of the block composition precursor to the tertiary amine compound may be 1:1.01-1.5, preferably 1:1.05-1.3.

In the present disclosure, the amount of the first strong acid, the second strong acid and the third strong acid are not specifically limited, and may be conventional selection in the art. In a preferred embodiment, the molar ratio of the first strong acid to the first aromatic compound may be 5-10:1, preferably 6-8:1. The molar ratio of the amount of the second strong acid to the second aromatic compound may be 5-10:1, preferably 6-8:1. The molar ratio of the third strong acid to the first precursor polymer may be 50-120:1, preferably 60-90:1.

In the present disclosure, the polymer may have a weight average molecular weight of 30000-1000000 g/mol, preferably 40000-500000 g/mol. The polydispersity may be 1-3, more preferably 1.1-2.0;

In step (1) of the method for preparing block polymers, the contact temperature may be 0-35° C. and the contact time may be 1-5 h.

In step (2) of the method for preparing block polymers, the contact temperature may be 0-35° C. and the contact time may be 0.5-2 h.

In step (3) of the method for preparing block polymers, the contact temperature may be 0-35° C. and the contact time may be 5-12 h.

In the method for preparing block polymers, the solvent used in steps (1), (2) and (3) is not specifically limited, which may be, for example, methylene chloride.

In step (4) of the method for preparing block polymers, the contact temperature may be 15-90° C. and the contact time may be 18-72 h. There is no special limit to the solvent used in step (4), which may be, for example, N-methylpyrrolidone and/or tetrahydrofuran.

A third aspect of the present disclosure provides a polymer prepared by the method described above.

A fourth aspect of the present disclosure provides the use of the polymers of the present disclosure in anion exchange membranes.

A fifth aspect of the present disclosure provides anion-exchange membranes comprising polymers of the present disclosure.

In the present disclosure, the anion-exchange membranes may be prepared from the polymers of the present disclosure by conventional methods in the art. In a specific embodiment, the method for preparing anion-exchange membranes comprising: dissolving the polymer prepared in this disclosure in the solvents such as dimethyl sulfoxide, N-methylpyrrolidone and/or N,N-dimethylformamide to prepare a film-forming solution with polymer mass/solvent volume (wt/V %) of 1%-20%, stirring the film-forming solution to prepare a homogeneous solution, then pouring it uniformly on a glass plate. After heating at 25-80° C. and evaporating the solvent to dry, the membrane is carefully peeled off from the glass plate to obtain a poly(biphenyl alkylene) anion exchange membrane in the form of bromide ions. The thickness of the obtained film is determined by the mass of the quaternized polymer in the film-forming solution. Then, the poly(biphenyl alkylene) anion exchange membrane in the form of bromide ions is immersed in a sodium hydroxide and/or potassium hydroxide solution for ion exchange, and the poly(biphenyl alkylene) anion exchange membrane in the form of hydroxide ions is obtained.

The polymers of the present disclosure comprise a fluorine-containing all-carbon main chain, flexible long alkyl side chains, and rigid benzene ring side groups. The main chain does not contain heteroatomic groups, and the cationic functional groups are connected by flexible long alkyl side chains, which reduces the influence of cationic groups on the main chain and greatly enhances alkali resistance. The flexible long alkyl side chains increase the distance between the cationic groups and the main chain, and reduces the swelling of the main chain. Meanwhile, the introduction of rigid hydrophobic benzene ring side groups further increases the difference between hydrophilic and hydrophobic chain segments due to the strong hydrophobicity of the benzene ring. In addition, the π-π interactions between the benzene rings make the hydrophobic chain segments more aggregated with each other, which further promotes the separation between the hydrophilic and hydrophobic microphases, which is conducive to the construction of more connected and efficient ion transport channels, and improves the ion conductivity and alkaline stability. The synthesis methods of the polymer are environment-friendly and simple. The introduction of haloalkyls in the polymer provides unlimited possibilities for subsequent cation functionalization. The ionomers and anion-exchange membranes prepared from the polymers can be applied to the fields such as fuel cells, water electrolysis, electrochemical reduction of carbon dioxide, electrodialysis and the like. The random type polymers provided by the disclosure have a simple synthesis method. The block polymers have relatively more synthesis steps, but more regular chain segment distribution structure can be obtained, and as a result the separation between the hydrophilic and hydrophobic microphases is further promoted. It improves ion conductivity and alkali resistance, further improve the performance of polyarylidene anion exchange membranes, and break through the limitations of Friedel-Crafts alkylation polymerization. A high-performance anion-exchange membrane having high ion conductivity, low swelling, and strong alkali resistance is obtained. In addition, no noble metal catalyst is required in a synthesis method, which is environment-friendly and simple. The polymer has a broad application prospect.

The present disclosure will be described in further detail below through examples.

In the following examples, the conductivity of hydroxide ions is measured as follows: cutting an anion exchange membrane into regular strips of 1.0×3.0 cm and sandwiching it between two pairs of copper electrodes; Immersing the assembled samples in ultrapure water and measuring and recoding the impedance of the anion-exchange membrane through a Princeton VersaSTAT 4 electrochemical workstation every 10° C. from 30° C. to 80° C., and calculating the OH-conductivity is calculated according to Formula (1):

$$\sigma = \frac{L}{AR} \quad (1)$$

wherein A (cm²) represents the effective membrane area calculated from the effective length between the two copper electrodes and the membrane thickness, L (cm) represents the distance, which is the width of the sample, and R represents the ohmic impedance (R, kΩ) of the membrane at different temperatures (30° C. to 80° C.) under fully hydrated conditions.

The water absorption rate WU (%) and the swelling rate SR (%) are tested according to the following method: immersing the hydroxide ion anion exchange membrane in deionized water at 30° C. and 80° C. for 24 h, respectively. After removal, excess water is wiped off the surface and the mass and length are recorded and labeled as $W_{wet}$ and $L_{wet}$, respectively. Afterwards, the anion-exchange membrane is dried in a vacuum oven at 80° C., and the weight $W_{dry}$ and length $L_{dry}$ of the membrane in the dry state are measured, respectively.

The water absorption rate and swelling rate at different temperatures are calculated by formulas (2) and (3):

$$WU(\%) = \frac{M_{wet} - M_{dry}}{M_{dry}} \times 100\% \quad (2)$$

$$SR(\%) = \frac{L_{wet} - L_{dry}}{L_{dry}} \times 100\% \quad (3)$$

The NMR spectra of the polymers are measured by Bruker Advance III 400 MHz spectrometer. The molecular weights of the prepared polymers are characterized by gel permeation chromatography (GPC, Waters 1515), using tetrahydrofuran as the mobile phase and polystyrene as the standard. The separation of hydrophilic and hydrophobic microphases on the surface of anion-exchange membrane is characterized using a Bruker atomic microscope. The thermal stability of the anion exchange membrane from 35 to 700° C. is analyzed using SDTQ600 under $N_2$ atmosphere, and the anion-exchange membranes is in the OH⁻ form and in the dry state.

The reagents used in the examples are obtained commercially.

Example 1

This example was to prepare trimethylamine quaternized multiblock polybiphenylene alkylidene PBPN-b-BPP (15%) with a ratio of hydrophobic chain segments to the polymer main chain of 15%, wherein the trifluoroalkyl ketone selected in the secondary polymerization was 7-bromo-1,1,1-trifluoro-2-heptanone. The polymer had structural formula as follows.

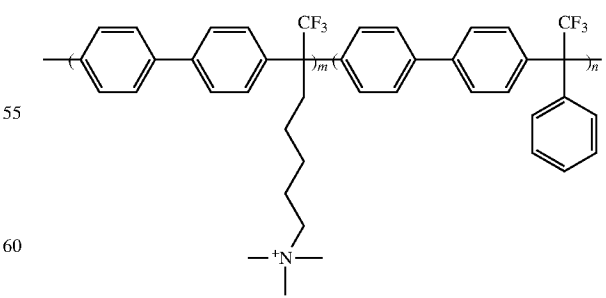

The specific preparation method included the following steps:
1) Synthesis of hydrophilic segment oligomers (O-PBPBr): 1.4 g of dibenzene and 2.69 g of 7-bromo- 1,1,1-trifluoro-2-heptanone were added to a single neck flask containing 6 ml of anhydrous dichloromethane, wherein the molar ratio of dibenzene to 7-bromo-1,1,1-trifluoro-2-heptanone was 1:1.2. After stirring to dissolve homogeneously, 6 ml of trifluoromethanesulfonic acid was added, and the reaction was carried out for 2 h at room temperature. After precipitation in methanol and filtration, a powdered polymer was obtained. The product was washed with methanol three times, collected and filtered, and dried at 80° C., and the hydrophilic segment oligomer was obtained. The hydrophilic segment had a molecular weight of 2786 g/mol and a dispersion of 1.469, i.e., a was approximately equal to 7, as detected by GPC. FIG. 1 showed $^1$H NMR spectra of O-PBPBr.

Figure 2:
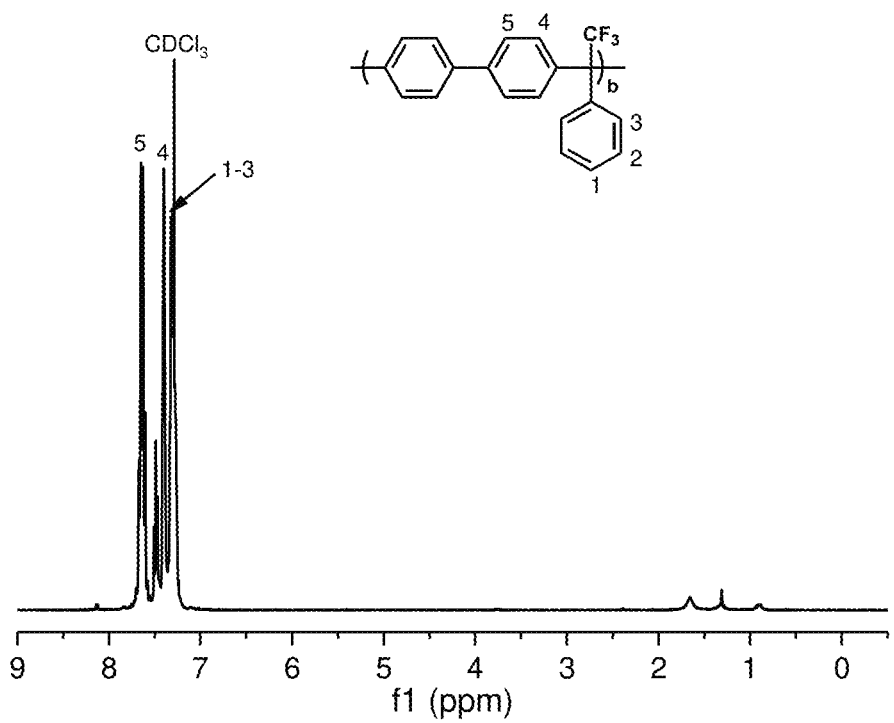
FIG. 2 shows $^1$H NMR spectra of the oligomer O-PBPP.

2) Synthesis of hydrophobic segment oligomers (O-PBPP): 1.4 g of dibenzene and 1.66 g of 2,2,2-trifluoroacetophenone was added to a single neck flask containing 6 ml of anhydrous dichloromethane, wherein the molar ratio of dibenzene to 2,2,2-trifluoroacetophenone was 1:1.05. The hydrophobic segment oligomers accounted for a lower proportion of the main chain of the subsequent block-like polymer, so it was more conducive to subsequent polymerization and structural modulation to make their molecular weights similar to or lower than those of the hydrophilic segment oligomers. The reactants were reacted for 1 hour at room temperature. After precipitation in methanol and filtration, powdered polymer particles was obtained. The powdered polymer was washed with methanol three times, collected and filtered, and dried at 80° C., and the hydrophobic segment oligomer was obtained. The hydrophobic segment had a molecular weight of 2039 g/mol and the dispersion of 1.379, i.e., b was approximately equal to 6, as detected by GPC. FIG. 2 showed $^1$H NMR spectra of O-PBPP.

Figure 3:
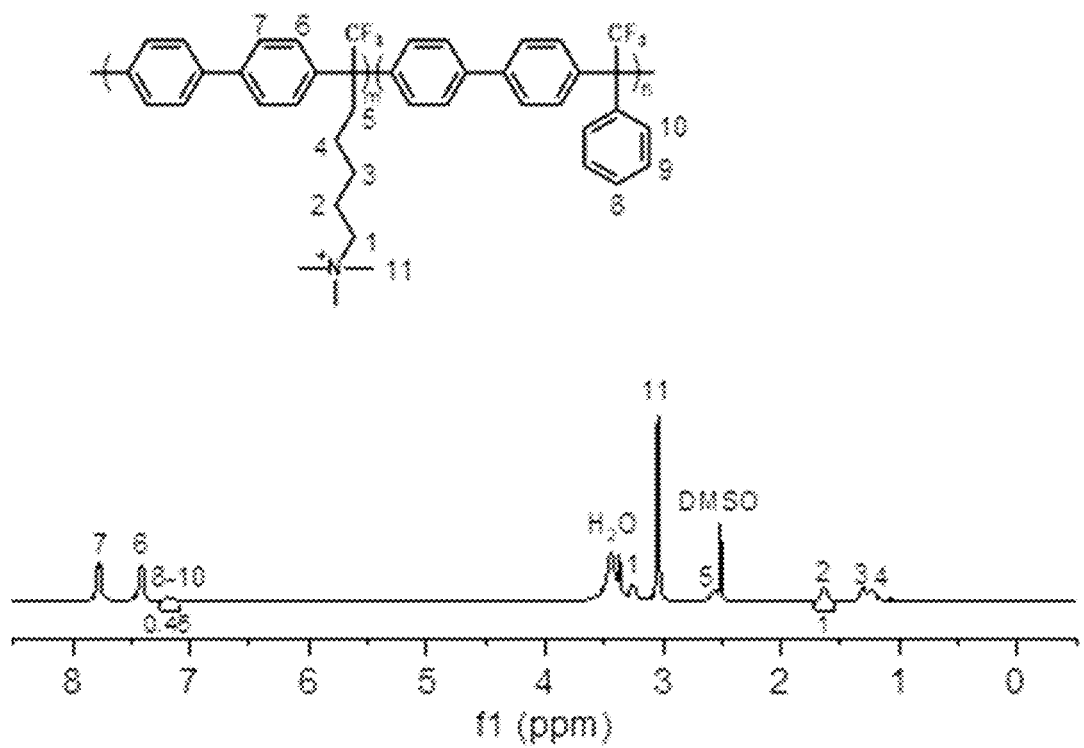
FIG. 3 shows $^1$H NMR spectra of the block polymer PBPBr-b-BPP (15%).

3) Synthesis of a multiblock copolymer (PBPBr-b-BPP (15%)): In the synthesis, hydrophilic segment oligomer:hydrophobic segment oligomer:trifluoroalkyl ketone:trifluoromethanesulfonic acid was 0.85:0.15:1.5:80, and anhydrous dichloromethane was used as the solvent, wherein the trifluoroalkyl ketone was at a concentration of 0.2 M in dichloromethane. Specifically, 1.63 g of O-PBPBr, 0.2 g of O-PBPP, and 0.25 g of 7-bromo-1,1,1-trifluoro-2-heptanone were dissolved into 5 ml of anhydrous dichloromethane and stirred for 1 h, to make sure it mixes well. After addition of 4.8 ml of trifluoromethanesulfonic acid, the reaction was carried out at room temperature for 8 h. When the reaction solution became highly viscous, it was precipitated in methanol. After filtration, the resulting polymer was dissolved again in dichloromethane and then precipitated into methanol and washed three times repeatedly. After filtering, a fibrous polymer was obtained, which was dried at 80° C., and the desired multiblock copolymer PBPBr-b-BPP (15%) was obtained. FIG. 3 showed $^1$H NMR spectra of PBPBr-b-BPP.

4) Trimethylamine quaternized block copolymer: 1 g of the synthesized brominated multiblock copolymer PBPBr-b-BPP (15%) was dissolved into a single neck flask containing 10 ml of tetrahydrofuran. After adding 5 ml of an aqueous solution of trimethylamine (30 wt %), the content was stirred and reacted for 6 h at room temperature. The polymer precipitated upon addition of aqueous trimethylamine, and the reaction solution became turbid. As the reaction proceeded, the polymer was gradually ionized and dissolved. After 6 h of reaction, the reaction solution became completely clarified. Again 5 ml of aqueous trimethylamine solution (30 wt %) was added and allowed to react for 6 h. After the reaction was complete, the solvent was removed from the reactants by rotary evaporation. The resulting polymer solid was dissolved into methanol (about 10 ml), and precipitated in a large amount of anhydrous ether, filtered, and then dried under vacuum at 80° C. Thus, the desired trimethylamine quaternized polymer (bromide ionic form) PBPN-b-BPP (15%), was obtained.

Figure 4:
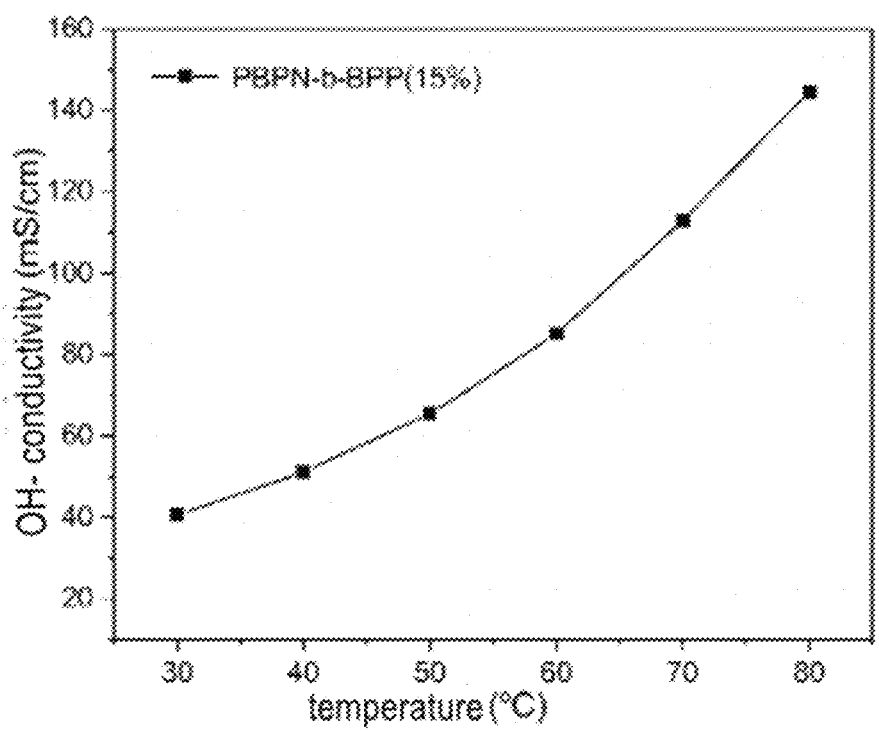
FIG. 4 shows the conductivity graph of the quaternized block polymer PBPN-b-BPP (15%).
Figure 5:
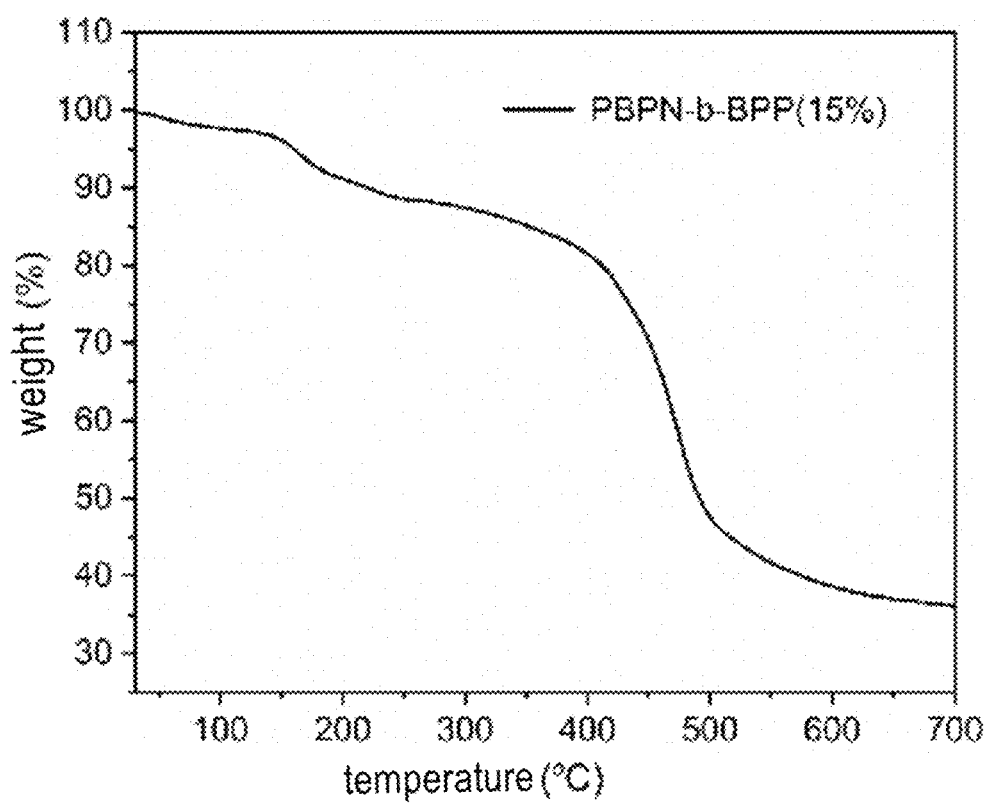
FIG. 5 shows the TGA graph of the quaternized block polymer PBPN-b-BPP (15%).
Figure 6:
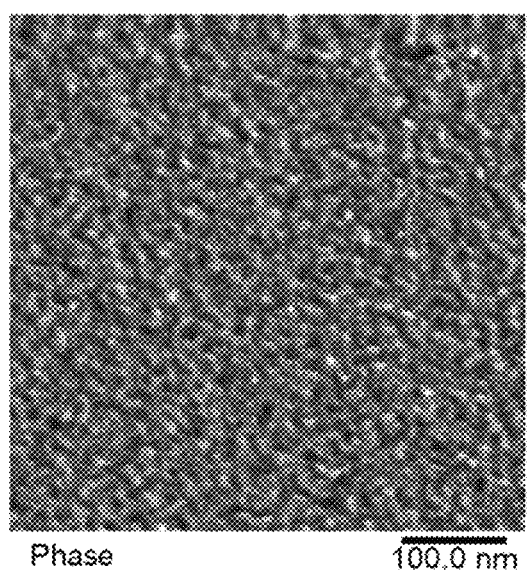
FIG. 6 shows the atomic force microscopy image of quaternized block polymer PBPN-b-BPP (15%).

FIG. 4 showed the conductivity plot of the quaternized polymer PBPN-b-BPP (15%). FIG. 5 showed the TGA graph of the quaternized polymer PBPN-b-BPP (15%). FIG. 6 showed the atomic force microscopy image of the quaternized polymer PBPN-b-BPP (15%).

5) Preparation of anion exchange membranes: 0.12 g of quaternized ionic polymer was added to 8 ml of dimethyl sulfoxide and stirred thoroughly for 12 h to prepare a homogeneous film-forming solution. The film-forming solution was filtered through a PTFE filter with a pore size of 0.45 μm to remove excess impurities and coated onto a clean, flat glass plate. After heating to evaporate the solvent dimethyl sulfoxide, a clear film was obtained. The membrane was carefully peeled off from the glass plate and immersed into 1 M NaOH solution for ion exchange. After immersing the aforementioned membrane for 24 h, it was washed with deionized water to remove NaOH, and then immersed in deionized water for 24 h to ensure removal of any remaining NaOH to obtain a quaternized multiblock polyalkylene biphenyl anion exchange membrane PBPN-b-BPP (15%) with a thickness of about 19 μm.

6) The characteristics of trimethylamine quaternized multiblock poly(biphenyl alkylene) anion exchange membrane PBPN-b-BPP (15%) were measured: the membrane had the water absorption rate of 75%, swelling rate of 14%, and hydroxide ion conductivity of 41 mS/cm at 30° C. The membrane had the water absorption rate of 98%, the swelling rate of 19%, and the hydroxide ion conductivity of 144 mS/cm at 80° C. The membrane did not degrade after immersion in a 1M NaOH solution at 80° C. for 30 days, and there was no significant change in conductivity before and after the alkali resistance test.

Example 2

This example provided a method for preparing a trimethylamine-functionalized multiblock poly(biphenyl alkylene) PBPN-b-BPP (10%), in which the proportion of hydrophobic chain segments to the polymer main chain was 10%.

The method was essentially the same as the method in Example 1, except that hydrophilic segment oligomer:hydrophobic segment oligomer:trifluoroalkyl ketone:trifluoromethanesulfonic acid was 0.90:0.10:1.5:80 in Step 3). By changing the feeding ratio of the hydrophilic and hydrophobic segment oligomers, the ratio of the hydrophilic and hydrophobic segments was regulated. The characteristics of PBPN-b-BPP (10%) were measured. The membrane had the water absorption rate of 93%, swelling rate of 21%, and hydroxide ion conductivity of 42 mS/cm at 30° C. The membrane had the water absorption rate of 108%, the swelling rate of 25%, and the hydroxide ion conductivity of 128 mS/cm at 80° C. The membrane did not degrade after immersion in a 1M NaOH solution at 80° C. for 30 days, and there was no significant change in conductivity before and after the alkali resistance test.

Example 3

This example provided a method for preparing a trimethylamine-functionalized multiblock poly(biphenyl alkylene) PBPN-b-BPP (20%) in which the proportion of hydrophobic chain segments to the polymer main chain was 20%. The method was essentially the same as the method in Example 1, except that hydrophilic segment oligomer:hydrophobic segment oligomer:trifluoroalkyl ketone:trifluoromethanesulfonic acid was 0.80:0.20:1.5:80 in Step 3). The ratio of the hydrophilic and hydrophobic segments was regulated by changing the feeding ratio of the hydrophilic and hydrophobic segment oligomers. The characteristics of PBPN-b-BPP (20%) was measured. The membrane had the water absorption rate of 69%, swelling rate of 13%, and hydroxide ion conductivity of 35 mS/cm at 30° C. The membrane had the water absorption rate of 91%, the swelling rate of 18%, and the hydroxide ion conductivity of 112 mS/cm at 80° C. The membrane did not degrade after immersion in a 1M NaOH solution at 80° C. for 30 days, and there was no significant change in conductivity before and after the alkali resistance test.

Example 4

This example provided a method for preparing a piperidine-functionalized multiblock poly(biphenyl alkylene) in which the proportion of hydrophobic chain segments to the polymer main chain was 15%. The method was essentially the same as the method in Example 1, except that 4-methylpiperidine was used as functionalizing agent in Step 4). The multiblock copolymer synthesized in Step 3) was dissolved in N-methylpyrrolidone and directly formulated into a film-forming solution, to which excess N-methylpiperidine was added and allowed to react at 80° C. for 48 h. After precipitating in ethyl acetate, washing three times repeatedly, filtering, and drying, the piperidine-functionalized multiblock poly(biphenyl alkylene) was obtained. The obtained piperidine-functionalized multiblock poly(biphenyl alkylene) is subjected to film-forming procedure according to step 5) of Example 1, and a clear and tough film was obtained. This example formed a more stable piperidinium cation structure in the polymer. The low ring strain and self-constrained conformation of the spirocyclic ammonium structure increased the transition state energy of the substitution and elimination reactions, thereby enhancing the alkali resistance of the anion-exchange membrane. The characteristics of ion exchange membrane were measured. The membrane had the water absorption rate of 67%, swelling rate of 13%, and hydroxide ion conductivity of 42 mS/cm at 30° C. The membrane had the water absorption rate of 91%, the swelling rate of 18%, and the hydroxide ion conductivity of 127 mS/cm at 80° C. The anion-exchange membrane did not degrade after immersion in a 1M NaOH solution at 80° C. for 30 days, and there was no significant change in conductivity before and after the alkali resistance test.

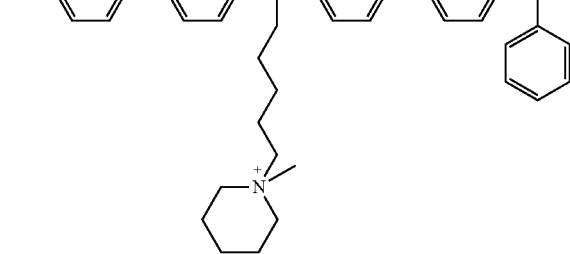

Example 5

This example provided a method for preparing a trimethylamine quaternized multiblock poly(m-triphenyl alkylidene) anion-exchange membranes in which the proportion of hydrophobic chain segments to the polymer main chain was 15%. The method is essentially the same as the preparation method in Example 1, except that biphenyl in Step 1) and Step 2) was replaced by m-terphenyl. The introduction of m-triphenyl formed an additional main chain twist structure, which contributes to the folding of the polymer chain. This introduction facilitated the formation of a more compact polymer structure, promoted the self-assembly of the ionic side chains, and formed a more efficient ion transport channel. The characteristics of ion exchange membrane were measured. The membrane had the water absorption rate of 37%, swelling rate of 6%, and hydroxide ion conductivity of 32 mS/cm at 30° C. The membrane had the water absorption rate of 64%, the swelling rate of 15%, and the hydroxide ion conductivity of 126 mS/cm at 80° C. The anion-exchange membrane did not degrade after immersion in a 1M NaOH solution at 80° C. for 30 days, and there were no significant change in conductivity before and after the alkali resistance test.

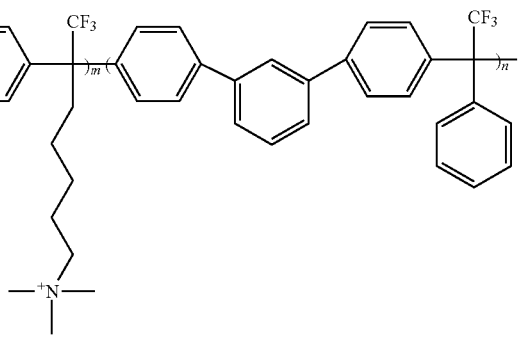

Example 6

This example provided a method for preparing a random copolymerized poly(biphenyl alkylene) PBPN-co-BPP (15%) anion exchange membrane with hydrophobic segment proportion of 15%. Polyalkylene dibiphenyl copolymers were obtained by direct polymerization of biphenyl, 1,1,1-trifluoro-7-bromo-2-heptanone and 2,2,2-trifluoroacetophenone by Friedel-Crafts alkylation condensation polymerization, a random condensation polymerization process. The hydrophobic chain segments containing 2,2,2-trifluoroacetophenone accounted for 15%. 1.4 g of dibenzene, 2.29 g of 1,1,1-trifluoro-7-bromo-2-heptanone and 0.206 g of 2,2,2-trifluoroacetophenone was added to a single neck flask containing 6 ml of anhydrous dichloromethane. Since 2,2,2-trifluoroacetophenone was more reactive than 1,1,1-trifluoro-7-bromo-2-heptanone, an excess of 1,1,1-trifluoro-7-bromo-2-heptanone was required to accelerate the reaction to obtain a high molecular weight polymer. After stirring to dissolve homogeneously, 6 ml of trifluoromethanesulfonic acid was added, and the reaction was carried out for 18 h at room temperature. After precipitation in methanol and filtration, a fiber-like flocculent polymer was obtained. The obtained polymer was washed with methanol three times, collected and filtered, and dried at 80° C. The random copolymerized poly(biphenyl alkylene) PBPN-co-BPP (15%) with 15% hydrophobic segments was obtained. The synthesis of the functionalized polymer and the preparation of the membrane were the same as Step 4) and Step 5) of Example 1. The characteristics of ion exchange membrane were measured. The membrane had the water absorption rate of 90%, swelling rate of 20%, and hydroxide ion conductivity of 38 mS/cm at 30° C. The membrane had the water absorption rate of 104%, the swelling rate of 21%, and the hydroxide ion conductivity of 110 mS/cm at 80° C. The anion-exchange membrane did not degrade after immersion in a 1M NaOH solution at 80° C. for 30 days, and there was no significant change in conductivity before and after the alkali resistance test.

Example 6. The characteristics of ion exchange membrane were measured. The membrane had the water absorption rate of 102%, swelling rate of 23%, and hydroxide ion conductivity of 43 mS/cm at 30° C. The membrane had the water absorption rate of 118%, the swelling rate of 27%, and the hydroxide ion conductivity of 121 mS/cm at 80° C. The anion-exchange membrane did not degrade after immersion in a 1M NaOH solution at 80° C. for 30 days, and there was no significant change in conductivity before and after the alkali resistance test.

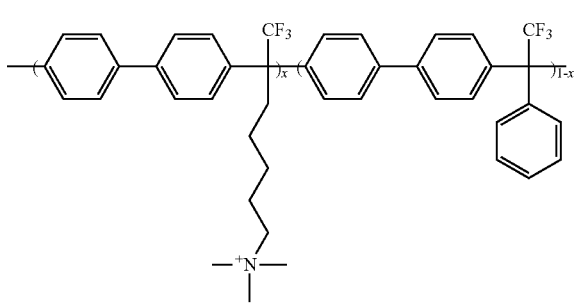 [SMILES: Cc1ccc(-c2ccc(C(CCCCC[N+](C)(C)C)(c3ccc(-c4ccc(C(C)(c5ccccc5)C(F)(F)F)cc4)cc3)C(F)(F)F)cc2)cc1]

Example 8

This Example provided a method for synthesizing an random type poly(biphenyl alkylene) PBPN-co-BPP (20%) with a hydrophobic segment proportion of 20%. 1.4 g of biphenyl, 2.15 g of 1,1,1-trifluoro-7-bromo-2-heptanone and 0.275 g of 2,2,2-trifluoroacetophenone were used to synthesize the polymer by using the same experimental steps as in Example 6. The characteristics of ion exchange membrane were measured. The membrane had the water absorption rate of 81%, swelling rate of 17%, and hydroxide ion conductivity of 35 mS/cm at 30° C. The membrane had the water absorption rate of 97%, the swelling rate of 18%, and the hydroxide ion conductivity of 101 mS/cm at 80° C. The anion-exchange membrane did not degrade after immersion in a 1M NaOH solution at 80° C. for 30 days, and there was no significant change in conductivity before and after the alkali resistance test.

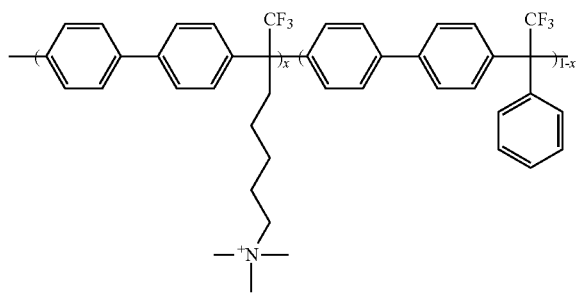 [SMILES: Cc1ccc(-c2ccc(C(CCCCC[N+](C)(C)C)(c3ccc(-c4ccc(C(C)(c5ccccc5)C(F)(F)F)cc4)cc3)C(F)(F)F)cc2)cc1]

Example 7

This Example provided a method for synthesizing an random type poly(biphenyl alkylene) PBPN-co-BPP (10%) with a hydrophobic segment proportion of 10%. 1.4 g of biphenyl, 2.42 g of 1,1,1-trifluoro-7-bromo-2-heptanone and 0.137 g of 2,2,2-trifluoroacetophenone were used to synthesize the polymer by the same experimental steps as in

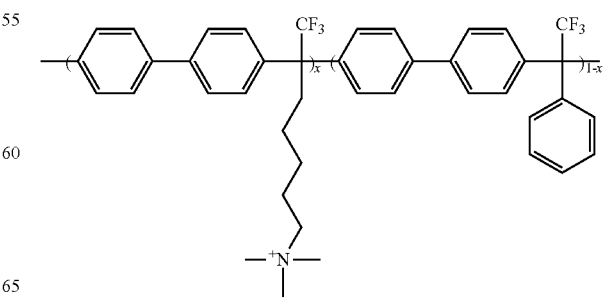

The data for the above examples were summarized in the table below:

| | water absorption rate | | swelling rate | | conductivity mS/cm | | Alkaline solution |
|---|---|---|---|---|---|---|---|
| | 30° C. | 80° C. | 30° C. | 80° C. | 30° C. | 80° C. | immersion result |
| Example 1 | 75% | 98% | 14% | 19% | 41 | 144 | No degrade, no change in conductivity |
| Example 2 | 93% | 108% | 21% | 25% | 42 | 128 | No degrade, no change in conductivity |
| Example 3 | 69% | 91% | 13% | 18% | 35 | 112 | No degrade, no change in conductivity |
| Example 4 | 67% | 91% | 13% | 18% | 42 | 127 | No degrade, no change in conductivity |
| Example 5 | 37% | 64% | 6% | 15% | 32 | 126 | No degrade, no change in conductivity |
| Example 6 | 90% | 104% | 20% | 21% | 38 | 110 | No degrade, no change in conductivity |
| Example 7 | 102% | 118% | 23% | 27% | 43 | 121 | No degrade, no change in conductivity |
| Example 8 | 81% | 97% | 17% | 18% | 35 | 101 | No degrade, no change in conductivity |
| Comparison* | | 145% | | 40% | | 122 | |

*The data obtained from PBPA+ recited in the literature (ACS Macro Lett. 2015, 4, 814-818), having the water absorption rate of 145%, the swelling rate of 40%, and the hydroxide ion conductivity of 122 mS/cm at 80° C.

The present application is illustrated above in conjunction with preferred embodiments, although these embodiments are exemplary and serve only for illustrative purposes. On this basis, various substitutions and improvements can be made to the present application, all of which fall within the scope of protection of the present application.

The invention claimed is:

1. A polymer comprising a structural unit represented by Formula (1) and a structural unit represented by Formula (2),

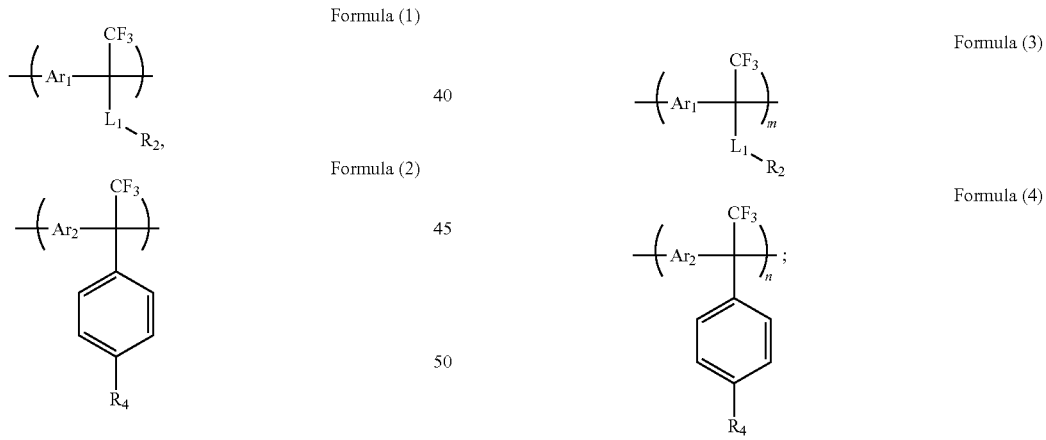

wherein $Ar_1$ and $Ar_2$ are each independently selected from an arylene group derived from an aromatic compound, $L_1$ is selected from a C1-C10 alkylene, $R_2$ is selected from a quaternary ammonium group; and $R_4$ is selected from H or a C1-C7 alkyl.

2. The polymer according to claim 1, wherein based on the total moles of the structural unit represented by Formula (1) and the structural unit represented by Formula (2), the proportion of the structural unit represented by Formula (1) is 60%-99%, and the proportion of the structural unit represented by Formula (2) is 1%-40%.

3. The polymer according to claim 1, wherein the polymer has a weight average molecular weight of 30000-1000000 g/mol.

4. The polymer according to claim 1, wherein the polymer is a random polymer;

5. The polymer according to claim 1, wherein the polymer is a block polymer comprising a block A having the structure represented by Formula (3), and a block B having the structure represented by Formula (4), based on the total moles of a structural unit represented by Formula (1) and a structural unit represented by Formula (2), the proportion of the structural unit represented by Formula (1) is 70%-98%; and the proportion of the structural unit represented by Formula (2) is 2%-30%.

wherein m represents the degree of polymerization of block A, m is 3-10; and n represents the degree of polymerization of block B, n is 3-10.

6. The polymer according to claim 1, wherein, based on the total moles of a structural unit represented by Formula (3) and a structural unit represented by Formula (4), the proportion of the structural unit represented by Formula (3) is 60%-99%; and the proportion of the structural unit represented by Formula (4) is 1%-40%.

7. The polymer according to claim 6, wherein the proportion of the structural unit represented by Formula (3) is 80%-90%; and the proportion of the structural unit represented by Formula (4) is 10%-20%.

8. The polymer according to claim 1, wherein $Ar_1$ and $Ar_2$ are each independently selected from at least one of the following structures:

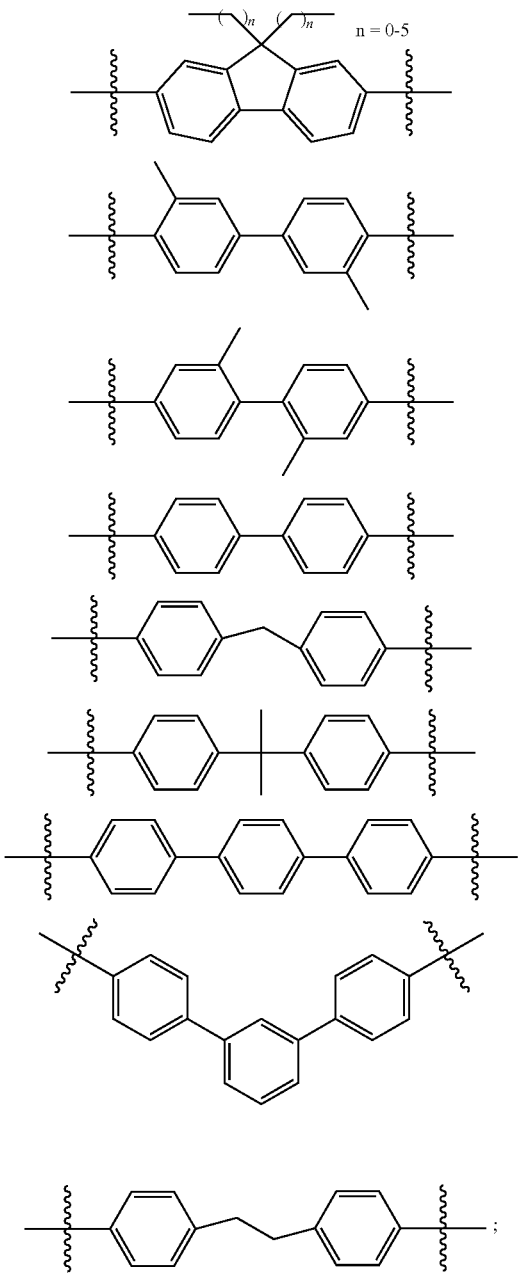

$R_2$ is selected from at least one of the following structures:

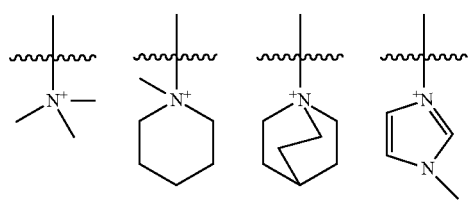

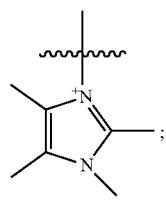

$R_4$ is selected from at least one of the following structures:
—H, —CH(CH$_3$)$_2$, —CH(CH$_3$) CH$_2$CH$_3$, —CH$_2$C(CH$_3$)$_3$, —(CH$_2$)pCH$_3$, wherein, p is an integer of 0-6.

9. The polymer according to claim 8, wherein the structures of $Ar_1$ and $Ar_2$ are shown below:

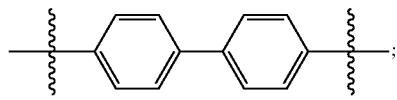

the structure of $R_2$ is shown below:

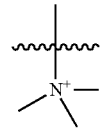

$R_4$ is H.

10. The polymer according to claim 1, wherein the structural unit represented by Formula (1) is a structural unit represented by Formula (5), and the structural unit represented by Formula (2) is a structural unit represented by Formula (6),

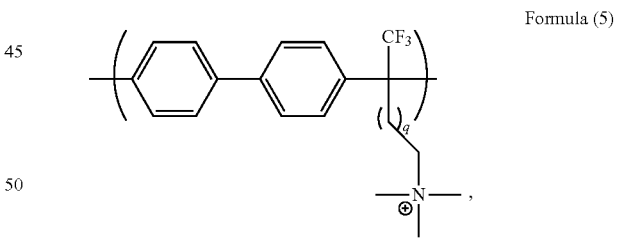

wherein q has a value of 1-10.

11. The polymer according to claim 10, wherein the polymer is a block polymer comprising a block A having the structure represented by Formula (7) and a block B having the structure represented by Formula (8),

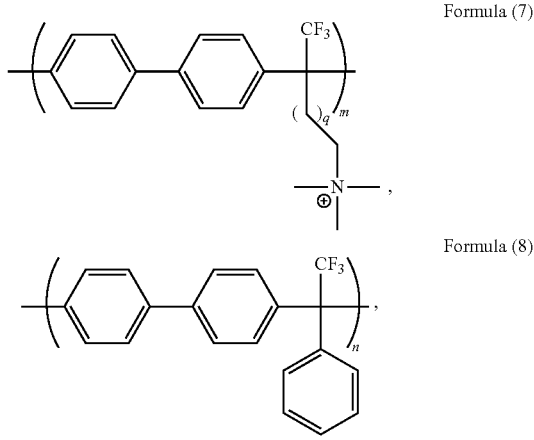

Formula (7)

Formula (8)

wherein m represents the degree of polymerization of block A, m is 3-10; and n represents the degree of polymerization of block B, n is 3-10.

12. A method for preparing polymers of claim 1, the method comprising:
contacting an aromatic compound with a first trifluoroalkyl ketone and a second trifluoroalkyl ketone in the presence of a strong acid, to form a precursor polymer; and
contacting the precursor polymer with a tertiary amine compound to form the polymers.

13. The method according to claim 12, wherein, the polymer is a random polymer, the method comprising:
(1) contacting an aromatic compound with a first trifluoroalkyl ketone and a second trifluoroalkyl ketone in the presence of a strong acid, to form a haloalkylated precursor polymer; and
(2) contacting the haloalkylated precursor polymer with a tertiary amine compound to form the polymers.

14. The method according to claim 13, wherein,
the strong acid is selected from at least one of the following compounds: trifluoromethanesulfonic acid, methanesulfonic acid, a mixed acid of trifluoromethanesulfonic acid and trifluoroacetic acid, a mixed acid of methanesulfonic acid and trifluoroacetic acid;
the aromatic compound is selected from at least one of the following compounds: biphenyl, terphenyl, m-terphenyl, diphenylmethane, 9,9-dimethylfluorene, 9,9-diethylfluorene, 9,9-dipropylfluorene, 9,9-dibutylfluorene, 9,9-dipentylfluorene, 9,9-dihexylfluorene, 1,2-diphenylethane, 2,2-dimethylbiphenyl, 2,2-diphenylpropane, 3,3'-dimethylbiphenyl;
the first trifluoroalkyl ketone is selected from at least one of the following: 7-bromo-1,1,1-trifluoro-2-heptanone, 7-chloro-1,1,1-trifluoro-2-heptanone, 6-bromo-1,1,1-trifluoro-2-hexanone, 5-bromo-1,1,1-trifluoro-2-pentanone and 8-bromo-1,1,1-trifluoro-2-octanone; the second trifluoroalkyl ketone is selected from at least one of the following: 2,2,2-trifluoroacetophenone, 2,2,2-trifluoro-1-(4-isopropylphenyl)ethan-1-one, 2,2,2-trifluoro-1-(4-(sec-butyl)phenyl)ethan-1-one, 2,2,2-trifluoro-1-(4-neopentylphenyl)ethan-1-one, 2,2,2-trifluoro-1-(4-ethylphenyl)ethan-1-one, 2,2,2-trifluoro-1-(4-propylphenyl)ethan-1-one, 2,2,2-trifluoro-1-(4-butylphenyl)ethan-1-one, 2,2,2-trifluoro-1-(4-pentylphenyl)ethan-1-one, 2,2,2-trifluoro-1-(4-hexylphenyl)ethan-1-one, and 2,2,2-trifluoro-1-(4-heptylphenyl)ethan-1-one;
the tertiary amine compound is selected from at least one of the following compounds: trimethylamine, N-methylpiperidine, quinine, N-methylimidazole, 1,2,4,5-tetramethylimidazole.

15. The method according to claim 13, wherein,
the molar ratio of the aromatic compound to the first trifluoroalkyl ketone, second trifluoroalkyl ketone is 1:(0.7-0.99):(0.01-0.3);
the molar ratio of the precursor polymer to the tertiary amine compound is 1:1.01-1.5;
the weight average molecular weight of the polymer is 30000-1000000 g/mol.

16. The method according to claim 12, wherein the polymer is a block polymer and the method comprises:
(1) contacting a first aromatic compound with a first trifluoroalkyl ketone in the presence of a first strong acid, to form a first precursor polymer;
(2) contacting a second aromatic compound with a second trifluoroalkyl ketone in the presence of a second strong acid, to form a second precursor polymer;
(3) contacting the first precursor polymer and the second precursor polymer with a first trifluoroalkyl ketone or a second trifluoroalkyl ketone in the presence of a third strong acid, to form a block polymer precursor; and
(4) contacting the block polymer precursor with a tertiary amine compound to form the block polymer.

17. The method according to claim 16, wherein,
the first aromatic compound and the second aromatic compound are each independently selected from at least one of the following compounds: biphenyl, terphenyl, m-terphenyl, diphenylmethane, 9,9-dimethylfluorene, 9,9-diethylfluorene, 9,9-dipropylfluorene, 9,9-dibutylfluorene, 9,9-dipentylfluorene, 9,9-dihexylfluorene, 1,2-diphenylethane, 2,2-dimethylbiphenyl, 2,2-diphenylpropane, 3,3'-dimethylbiphenyl;
the tertiary amine compound is selected from at least one of the following compounds: trimethylamine, N-methylpiperidine, quinine, N-methylimidazole, 1,2,4,5-tetramethylimidazole;
the first strong acid, the second strong acid and the third strong acid are each independently selected from at least one of the following compounds: trifluoromethanesulfonic acid, methanesulfonic acid, a mixed acid of trifluoromethanesulfonic acid and trifluoroacetic acid, a mixed acid of methanesulfonic acid and trifluoroacetic acid;
the first trifluoroalkyl ketone is selected from at least one of the following: 7-bromo-1,1,1-trifluoro-2-heptanone, 6-bromo-1,1,1-trifluoro-2-hexanone, 5-bromo-1,1,1-trifluoro-2-pentanone and 8-bromo-1,1,1-trifluoro-2-octanone, more preferably, 7-bromo-1,1,1-trifluoro-2-heptanone; the second trifluoroalkyl ketone is selected from at least one of the following: 2,2,2-trifluoroacetophenone, 2,2,2-trifluoro-1-(4-isopropylphenyl)ethan-1-one, 2,2,2-trifluoro-1-(4-(sec-butyl)phenyl)ethan-1-one, 2,2,2-trifluoro-1-(4-neopentylphenyl)ethan-1-one, 2,2,2-trifluoro-1-(4-ethylphenyl)ethan-1-one, 2,2,2-trifluoro-1-(4-propylphenyl)ethan-1-one, 2,2,2-trifluoro-1-(4-butylphenyl)ethan-1-one, 2,2,2-trifluoro-1-(4-pentylphenyl)ethan-1-one, 2,2,2-trifluoro-1-(4-hexylphenyl)ethan-1-one, and 2,2,2-trifluoro-1-(4-heptylphenyl)ethan-1-one.

18. The method according to claim 16, wherein,
the molar ratio of the first aromatic compound to the first trifluoroalkyl ketone is 1:(1.01-1.5);
the molar ratio of the second aromatic compound to the second trifluoroalkyl ketone is 1:(1-1.3);

the molar ratio of the first precursor polymer, the second precursor polymer to the first trifluoroalkyl ketone or second trifluoroalkyl ketone is (0.75-0.95):(0.05-0.25):(1.2-2); and the molar ratio of the block polymer precursor to the tertiary amine compound is 1:1.01-1.5.

19. The method according to claim 16, wherein the block polymer has a weight average molecular weight of 30000-1000000 g/mol.

20. An anion-exchange membrane comprising the polymer of claim 1.

* * * * *